United States Patent
Du et al.

(10) Patent No.: US 9,450,756 B2
(45) Date of Patent: Sep. 20, 2016

(54) METHOD AND SYSTEM FOR AUTHENTICATING ENTITY BASED ON SYMMETRIC ENCRYPTION ALGORITHM

(75) Inventors: Zhiqiang Du, Xi'an (CN); Manxia Tie, Xi'an (CN); Guoqiang Zhang, Xi'an (CN); Qin Li, Xi'an (CN)

(73) Assignee: CHINA IWNCOMM CO., LTD., Xi'an (CN)

( * ) Notice: Subject to any disclaimer, the term of this patent is extended or adjusted under 35 U.S.C. 154(b) by 398 days.

(21) Appl. No.: 13/879,619

(22) PCT Filed: Dec. 22, 2010

(86) PCT No.: PCT/CN2010/080088
§ 371 (c)(1),
(2), (4) Date: Apr. 23, 2013

(87) PCT Pub. No.: WO2012/048501
PCT Pub. Date: Apr. 19, 2012

(65) Prior Publication Data
US 2013/0212390 A1 Aug. 15, 2013

(30) Foreign Application Priority Data

Oct. 15, 2010 (CN) .......................... 2010 1 0511035
Nov. 23, 2010 (CN) .......................... 2010 1 0567506

(51) Int. Cl.
*H04L 9/32* (2006.01)
*H04W 12/06* (2009.01)

(52) U.S. Cl.
CPC ............... *H04L 9/32* (2013.01); *H04L 9/3271* (2013.01); *H04W 12/06* (2013.01)

(58) Field of Classification Search
CPC ....................................................... H04L 9/32
USPC ......................................................... 713/168
See application file for complete search history.

(56) References Cited

U.S. PATENT DOCUMENTS 8,074,083 B1 * 12/2011 Lee et al. ...................... 713/194
8,392,710 B2    3/2013 Tie et al.

(Continued)

FOREIGN PATENT DOCUMENTS

CN          101165701          4/2008
CN          101286844          10/2008

(Continued)

OTHER PUBLICATIONS

Chinese Patent Office, "First Office Action", issued in connection with application No. 201010567506.2, mailed Jul. 7, 2011, (4 pages).

(Continued)

*Primary Examiner* — Morshed Mehedi
*Assistant Examiner* — Khalil Naghdali
(74) *Attorney, Agent, or Firm* — Hanley, Flight & Zimmerman, LLC (57) ABSTRACT

A method and a system for authenticating an entity based on a symmetric encryption algorithm are provided. The method includes the following steps: 1) an entity A sends an authentication request message to an entity B; 2) after receiving the authentication request message, the entity B sends an authentication response message to the entity A; 3) the entity A determines the validity of the entity B according to the received authentication response message. The implementation cost of the system can be reduced by using the authentication according to the invention.

18 Claims, 2 Drawing Sheets

(56) References Cited

U.S. PATENT DOCUMENTS

| | | | |
|---|---|---|---|
| 2005/0050328 A1* | 3/2005 | Mizrah | 713/171 |
| 2006/0143453 A1* | 6/2006 | Imamoto et al. | 713/169 |
| 2008/0313464 A1* | 12/2008 | Fascenda et al. | 713/171 |
| 2009/0094372 A1* | 4/2009 | Nyang et al. | 709/229 |
| 2011/0138192 A1* | 6/2011 | Kocher et al. | 713/189 |
| 2011/0164749 A1* | 7/2011 | Natarajan | 380/270 |

FOREIGN PATENT DOCUMENTS

| | | |
|---|---|---|
| CN | 101364875 | 2/2009 |
| CN | 101364876 | 2/2009 |
| CN | 100544249 C | 9/2009 |
| CN | 101645899 A | 2/2010 |
| CN | 101754213 | 6/2010 |
| CN | 102014386 | 4/2011 |
| EP | 2073430 A1 | 6/2009 |
| WO | 2012048501 | 4/2012 |

OTHER PUBLICATIONS

International Searching Authority, "International Preliminary Report on Patentability" issued in connection with corresponding PCT application No. PCT/CN2010-080088, issued on Apr. 16, 2013 (6 pages).

International Searching Authority, "International Search Report", issued in connection with corresponding PCT application No. PCT/CN2010-080088, issued on Jul. 21, 2011 (4 pages).

International Searching Authority, "Written Opinion of the International Searching Authority", issued in connection with corresponding PCT application No. PCT/CN2010-080088, issued on Jul. 12, 2011 (5 pages).

Li Yali, "Research on Authentication and Key Exchange Protocol for RFID System", A Dissertation submitted to Shanghai Jiao Tong University, Jan. 18, 2010 (77 pages).

The State Intellectual Property Office of China, "First Office Action and Search Report", issued on Jul. 7, 2011 for counterpart Chinese patent application No. 201010567506.2, along with the English translation (10 pages).

* cited by examiner

METHOD AND SYSTEM FOR AUTHENTICATING ENTITY BASED ON SYMMETRIC ENCRYPTION ALGORITHM

FIELD OF THE INVENTION

This invention relates to the field of network security application in the information security technology, and particularly, to a method and a system for authenticating an entity based on a symmetric encryption algorithm.

BACKGROUND OF THE INVENTION

A wireless network such as Wireless Local Area Network (WLAN) or wireless sensor network is easily subjected to attacks like forgery, replay, etc. due to its wireless and broadcast characteristics in communications. As a wireless technology, the Radio Frequency Identification (RFID) also encounters the same security problem. The problem of identity authentication between the reader and the electronic tag in the RFID system must be solved before the communication, so as to ensure the validity of the identities of both parties concerned in the communication. For the security mechanism which is based on a Public Key Infrastructure (PKI) and a digital certificate, the digital certificate needs to be managed in the authentication process, thus the system has excessive communication traffic and management load, and it is not suitable for the RFID application. A security mechanism based on a pre-shared key is a method conventionally used by the RFID.

Presently, some authentication protocols based on the pre-shared key have been proposed in the industry. But analyses show that those protocols generally have the following shortages: 1) the key shared by the electronic tag and the reader needs to be stored in a database, which increases the implementation cost of the system; and 2) in the authentication process, the reader needs to query the database, which may cause a security problem and a long delay for the authentication. Therefore, the authentication methods in the prior art cannot completely meet the RFID application requirement.

SUMMARY OF THE INVENTION

In order to solve the above problem present in the prior art, it is necessary to provide a method and a system for authenticating an entity based on a symmetric encryption algorithm, so as to better meet the RFID application requirement.

The technical solution of the present invention is a method for authenticating an entity based on a symmetric encryption algorithm, comprising:

1) sending, by an entity A, an authentication request message to an entity B;

2) sending, by the entity B, an authentication response message to the entity A after receiving the authentication request message sent by the entity A; and 3) determining, by the entity A, the validity of the entity B according to the received authentication response message.

After step 3), the entity A may send an authentication result message to the entity B, and if the entity A determines that the entity B is valid, the authentication result message contains authentication success information; otherwise, the authentication result message contains authentication failure information. In that case, a message timeout processing threshold T3 may be set in step 2), and if the entity B does not correctly receive the authentication result message within time T3 after sending the authentication response message, the entity B resends the authentication response message to the entity A; further, if the entity B still does not correctly receive the authentication result message after the authentication response message has been resent n times and the time by which the authentication result message is waited to be received is T3 each time, the entity B determines that the authentication fails, wherein n is a preset number of times of resending the authentication response message.

In order to implement a mutual authentication between the entity A and the entity B, the method further comprises: after determining, by the entity A, the validity of the entity B according to the received authentication response message, performing step 4.1) if the entity B is determined as valid; or performing step 4.2) if the entity B is determined as invalid; 4.1) sending, by the entity A, an authentication response acknowledge message to the entity B; and 4.2) discarding, by the entity A, the authentication response message.

The above method may further include: 4.3) determining, by the entity B, the validity of the entity A according to the received authentication response acknowledge message; if the entity A is valid, it means that a mutual identity authentication between the entity A and the entity B is successful; and if the entity A is invalid, the authentication response acknowledge message is discarded.

After receiving the authentication response acknowledge message, the entity B may send an authentication result message to the entity A. If the entity B determines that the entity A is valid, the authentication result message contains authentication success information; otherwise the authentication result message contains authentication failure information. In that case, a message timeout processing threshold T4 may be further set in step 4.1). If the entity A does not correctly receive the authentication result message within time T4 after sending the authentication response acknowledge message, the entity A resends the authentication response acknowledge message to the entity B; further, if the entity A still does not correctly receive the authentication result message when the authentication response acknowledge message is resent q times and the time by which the authentication result message is waited to be received is T4 each time, the entity A determines that the authentication fails, wherein q is a preset number of times of resending the authentication response acknowledge message.

A Pre-Shared key (PSK) has been shared between the entity A and the entity B.

Step 1) may be specifically implemented as sending, by the entity A, an authentication request message comprising N1 to the entity B, wherein N1 is a random number generated by the entity A.

Step 2) may be specifically implemented as:

2.1) the entity B generates a random number N3 after receiving the authentication request message sent by the entity A, and calculates a message authentication code $MAC1=E(N1\|N3,PSK)$, wherein "$\|$" represents concatenation of messages, E is a symmetric encryption algorithm, and MAC1 contains an integrity check code ACC1 calculated on $N1\|N3$ with the PSK and a ciphertext formed after an encryption. Further, in order to improve the security, before calculating the message authentication code MAC1 by the entity B, the entity B derives an integrity check key PSK1 and an encryption key PSK2 according to the PSK, calculates the integrity check code ACC1 using PSK1, and performs encryption using PSK2 to form a ciphertext, then MAC1=E(N1∥N3,PSK1∥PSK2).

2.2) the entity B constructs the authentication response message comprising N1 and MAC1, sends the authentication response message to the entity A, and takes N3 as a session key with the entity A.

Step 3) may be specifically implemented as:

3.1) after receiving the authentication response message sent by the entity B, the entity A determines whether N1 is equal to N1 generated by the entity A in step 1); if not equal, then perform step 3.2); and if equal, perform step 3.3);

3.2) the entity A discards the authentication response message (20);

3.3) the entity A decrypts a ciphertext in MAC1 to obtain N1 and N3, calculates an integrity check code ACC1', and compares whether the integrity check codes ACC1 and ACC1' are equal to each other; if not equal, perform step 3.2); and if equal, perform step 3.4);

3.4) the entity A determines whether N1 obtained by decryption is equal to N1 generated by the entity A in step 1); if equal, the entity A determines that the entity B is valid, which means that the entity A performs a successful authentication on the entity B, and the entity A takes N3 obtained by decryption as a session key with the entity B; if not equal, the entity A determines that the entity B is invalid.

Step 2) may also be specifically implemented as:

2.1') after receiving the authentication request message sent by the entity A, the entity B generates random numbers N2 and N3, and calculates a message authentication code MAC1=E(N1∥N2∥N3,PSK), wherein ∥ represents concatenation of messages, E is a symmetric encryption algorithm, and MAC1 contains an integrity check code ACC1 calculated on N1∥N2∥N3 using the PSK and a ciphertext formed after an encryption. Further, in order to improve the security, before calculating, by the entity B, the message authentication code MAC1, the entity B derives an integrity check key PSK1 and an encryption key PSK2 according to the PSK, calculates the integrity check code ACC1 using PSK1, and performs encryption using PSK2 to form a ciphertext, then MAC1=E(N1∥N2∥N3,PSK1∥PSK2);

2.2') the entity B constructs the authentication response message comprising N1 and MAC1, and sends the authentication response message to the entity A.

Step 3) may also be specifically implemented as:

3.1') after receiving the authentication response message sent by the entity B, the entity A determines whether N1 is equal to N1 generated by the entity A in step 1); if not equal, perform step 3.2'); and if equal, perform step 3.3');

3.2') the entity A discards the authentication response message;

3.3') the entity A decrypts a ciphertext in MAC1 to obtain N1, N2 and N3, calculates an integrity check code ACC1', and comparing whether the integrity check codes ACC1' and ACC1 are equal to each other; if not equal, perform step 3.2'); and if equal, perform step 3.4');

3.4') the entity A determines whether N1 obtained by decryption is equal to N1 generated by the entity A in step 1); if equal, the entity A determines that the entity B is valid, which means that the entity A performs a successful authentication on the entity B, and the entity A takes N3 obtained by decryption as a session key with the entity B; if not equal, the entity A determines that the entity B is invalid.

Based on the symmetric encryption algorithm, the present invention implements a unilateral identity authentication on the entity B by the entity A, and it is suitable for RFID, wireless LAN, wired LAN, sensor network, etc.

Step 4.1) may be specifically implemented as: after performing a successful authentication on the entity B, the entity A constructs the authentication response acknowledge message comprising N2 and sends the authentication response acknowledge message to the entity B.

Step 4.3) may be specifically implemented as: after receiving the authentication response acknowledge message sent by the entity A, the entity B determines whether N2 is equal to N2 generated by the entity B in step 2); if not equal, the entity B discards the authentication response acknowledge message; and if equal, the entity B determines that the entity A is valid, which means that the entity B performs a successful authentication on the entity A, and the entity B takes N3 as a session key with the entity A.

Step 4.1) may also be specifically implemented as: after performing a successful authentication on the entity B, the entity A calculates MAC2=E(N2,N3), constructs the authentication response acknowledge message comprising N2 and MAC2, and sends the authentication response acknowledge message to the entity B, wherein E is a symmetric encryption algorithm, MAC2 contains an integrity check code ACC2 calculated on N2 using N3 and a ciphertext formed after an encryption. Further, in order to improve the security, before calculating MAC2, the entity A derives an integrity check key N31 and an encryption key N32 according to N3, calculates the integrity check code ACC2 using N31, and performs encryption using N32 to form a ciphertext, then MAC2=E(N2,N31∥N32).

Step 4.3) may also be specifically implemented as:

4.3.1) after receiving the authentication response acknowledge message sent by the entity A, the entity B determines whether N2 is equal to N2 generated by the entity B in step 2); if not equal, perform step 4.3.2); and if equal, perform step 4.3.3);

4.3.2) the entity B discards the authentication response acknowledge message;

4.3.3) the entity B decrypts a ciphertext in MAC2 using N3 to obtain N2, calculates an integrity check code ACC2', and compares whether the integrity check codes ACC2' and ACC2 are equal to each other; if not equal, perform step 4.3.2); and if equal, perform step 4.3.4);

4.3.4) the entity B determining whether N2 obtained by decryption is equal to N2 generated by the entity B in step 2); if equal, the entity B determines that the entity A is valid, which means that the entity B performs a successful authentication on the entity A; since the entity A has already performed a successful authentication on the entity B, the mutual identity authentication between the entity A and the entity B succeeds at that time; the entity B takes N3 as a session key with the entity A; and if not equal, the entity B determines that the entity A is invalid and discards the authentication response acknowledge message.

In step 1), the entity A also sets a message timeout processing threshold T1 for itself. Thus in step 1), if the entity A does not correctly receive the authentication response message within time T1 after sending the authentication request message, the entity A resends the authentication request message to the entity B; further, if the entity A still does not correctly receive the authentication response message after the authentication request message has been resent m times and the time by which the authentication response message is waited to be received is T1 each time, the entity A determines that the authentication fails, wherein m is a preset number of times of resending the authentication request message.

In step 2), the entity B also sets a message timeout processing threshold T2 for itself. Thus in step 2), if the entity B does not correctly receive the authentication response acknowledge message within time T2 after sending the authentication response message, the entity B resends the authentication response message to the entity A; further, if the entity B still does not correctly receive the authentication response acknowledge message after the authentication response message has been resent p times and the time by which the authentication response acknowledge message is waited to be received is T2 each time, the entity B determines that the authentication fails, wherein p is a preset number of times of resending the authentication response message.

The present invention further provides a system for authenticating an entity based on a symmetric encryption algorithm, and the system comprises an entity A and an entity B having shared a Pre-Shared Key (PSK) therebetween. The entity A sends an authentication request message to the entity B and receives an authentication response message from the entity B; and the entity B receives the authentication request message from the entity A and sends the authentication response message to the entity A.

The present invention further provides an authenticating entity based on a symmetric encryption algorithm, and the authenticating entity has shared a Pre-Shared Key (PSK) with an entity to be authenticated. The authenticating entity comprises:

a first sending module configured to send an authentication request message to the entity to be authenticated;

a first receiving module configured to receive an authentication response message which is returned by the entity to be authenticated after having received the authentication request message; and a first authenticating module configured to determine the validity of the entity to be authenticated according to the received authentication response message.

Optionally, the authenticating entity further comprises:

a second sending module configured to send an authentication response acknowledge message to the entity to be authenticated when the entity to be authenticated is valid, so that the entity to be authenticated determines the validity of the authenticating entity after receiving the authentication response acknowledge message.

The present invention further provides an entity to be authenticated based on a symmetric encryption algorithm, and the entity to be authenticated has shared a Pre-Shared Key (PSK) with an authenticating entity. The authenticated entity comprises:

a second receiving module configured to receive an authentication request message sent by the authenticating entity; and a third sending module configured to send an authentication response message to the authenticating entity, so that the authenticating entity determines the validity of the entity to be authenticated according to the authentication response message.

Optionally, the authenticated entity further comprises:

a third receiving module configured to receive an authentication response acknowledge message sent by the authenticating entity; and a second authenticating module configured to determine the validity of the authenticating entity after receiving the authentication response acknowledge message.

As compared with the prior art, the present invention has the following advantages: 1) a mutual authentication between the electronic tag and the reader can be realized, and a shared session key can be established; 2) the system implementation cost is reduced, since the PSK-based and offline-allowable mutual authentication method provided by the present invention does not need the support of a backend database, so the system implementation cost is reduced; 3) the authentication efficiency is higher, since the PSK-based and offline-allowable mutual authentication method provided by the present invention does not need to query a database during the authentication, so the authentication efficiency is improved; and 4) the method provided in the invention is suitable for online or offline authentication, since the PSK-based and offline-allowable mutual authentication method provided by the present invention does not need the support of a backend database, so it is suitable for online or offline authentication, especially for offline authentication.

DETAILED DESCRIPTION OF THE PREFERRED EMBODIMENTS

The technical solutions of the embodiments of the present invention will be clearly and completely described as follows with reference to the drawings. Apparently, the described embodiments are just a part of embodiments of the present invention rather than all the embodiments. Based on the embodiments of the present invention, any other embodiment obtained by a person skilled in the art without paying any creative effort shall fall within the protection scope of the present invention.

Figure 1:
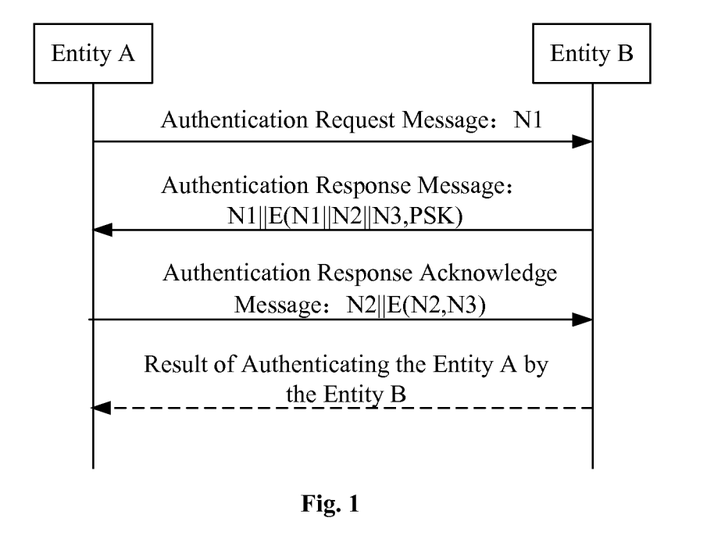
FIG. 1 is a structure diagram of a system for authenticating an entity provided by the present invention.

Referring to FIG. 1, the present invention provides a method for authenticating an entity based on a symmetric encryption algorithm, wherein a Pre-Shared Key (PSK) has been shared between an entity A and an entity B when the method is implemented, the method comprising the following steps.

In step S1, the entity A sends an authentication request message 10 to the entity B.

Figure 2:
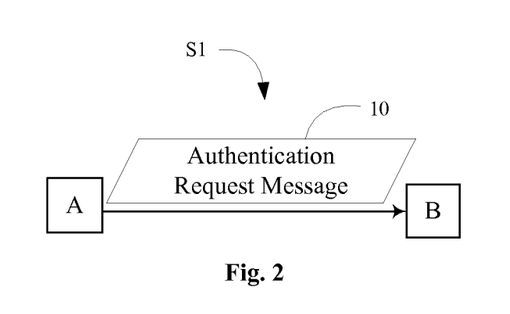
FIG. 2 is a flow diagram of step S1 in FIG. 1.

Please refer to FIG. 2, the authentication request message 10 may include N1, which is a random number generated by the entity A.

In step S2, after receiving the authentication request message 10 sent by the entity A, the entity B sends an authentication response message 20 to the entity A.

Figure 3:
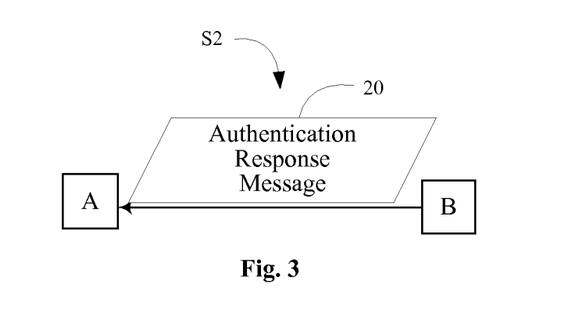
FIG. 3 is a flow diagram of step S2 in FIG. 1.

Please refer to FIG. 3, after receiving the authentication request message 10 sent by the entity A, the entity B firstly generates random numbers N2 and N3, then calculates a message authentication code MAC1=E(N1∥N2∥N3,PSK), in which "∥" represents concatenation of messages, and E is a symmetric encryption algorithm which may be a block encryption algorithm or a stream encryption algorithm. MAC1 contains an integrity check code ACC1 calculated on N1∥N2∥N3 with the PSK and a ciphertext formed after an encryption. That is, MAC1 may contain the integrity check code ACC1 calculated on N1∥N2∥N3 with the PSK and a ciphertext formed after an encryption of N1, N2, N3 and ACC1, or contain a ciphertext formed after an encryption of N1∥N2∥N3 with the PSK and an integrity check code ACC1 calculated on the ciphertext. The entity B constructs an authentication response message 20 and sends it to the entity A, and the authentication response message 20 includes N1 and MAC1.

To be noted, the entity B does not need to generate the random number N2 when the entity A performs a unilateral authentication on the entity B. In that case, the message authentication code MAC1=E(N1||N3,PSK), and the entity B takes N3 as a session key with the entity A after sending the authentication response message 20.

In step S3, after receiving the authentication response message 20 sent by the entity B, the entity A authenticates the entity B.

Figure 4:
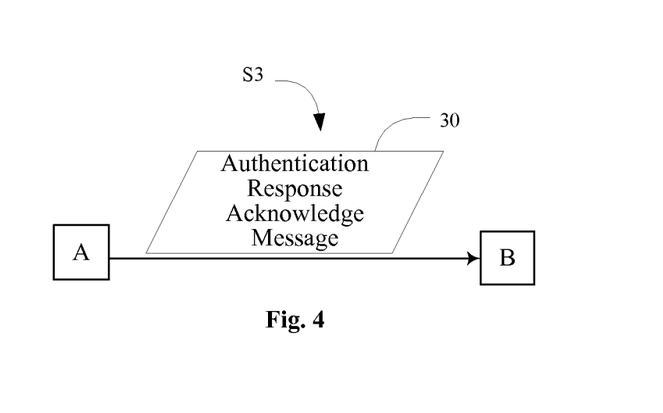
FIG. 4 is a flow diagram of step S3 in FIG. 1.

Please refer to FIG. 4, the entity A firstly determines whether N1 in the message authentication code is equal to N1 generated by the entity A in step S1; if not equal, the entity A discards the authentication response message 20.

If N1 in the message authentication code is equal to N1 generated by the entity A in step S1, the entity A decrypts the ciphertext in MAC1 to obtain N1, N2 and N3, and calculates an integrity check code ACC1'. The entity A compares the integrity check codes ACC1' and ACC1, and discards the authentication response message 20 if ACC1' and ACC1 are not equal to each other, or determines whether N1 obtained by decryption is equal to N1 generated by itself in step S1 if ACC1' and ACC1 are equal to each other. If N1 obtained by decryption by the entity A is equal to N1 generated by itself in step S1, the entity A determines that the entity B is valid, which means that the entity A performs a successful authentication on the entity B, and the entity A takes N3 obtained by decryption as a session key with the entity B. If N1 obtained by decryption by the entity A is not equal to N1 generated by itself in step S1, the entity A discards the authentication response message 20.

To be noted, when the entity A performs a unilateral authentication on the entity B, i.e., MAC1=E(N1||N3,PSK), only N1 and N3 are obtained by decryption by the entity A after it receives the authentication response message 20 sent from the entity B.

In order to realize the mutual authentication between the entity A and the entity B, the following step S4 may be further performed.

In step S4, after performing a successful authentication on the entity B (i.e., determining that the entity B is valid), the entity A sends an authentication response acknowledge message 30 to the entity B.

The entity A firstly calculates MAC2=E(N2,N3), then constructs an authentication response acknowledge message 30 that includes N2 and MAC2, and sends it to the entity B. E is a symmetric encryption algorithm, MAC2 contains an integrity check code ACC2 calculated on N2 with N3 and a ciphertext formed after an encrypting N2 and ACC2, or MAC2 contains a ciphertext formed after an encrypting N2 with N3 and an integrity check code ACC2 calculated on the ciphertext. The operation of calculating MAC2=E(N2,N3) by the entity A is optional. Correspondingly, MAC2 contained in the authentication response acknowledge message 30 is also optional, and the authentication response acknowledge message 30 may only contain N2.

In order to improve the security, before the calculation of the message authentication code MAC1, in step S2 an integrity check key PSK1 and an encryption key PSK2 may be firstly derived according to the PSK, the integrity check code ACC1 is calculated using the PSK1, and the ciphertext is formed through encryption using the PSK2, and in that case, MAC1=E(N1||N2||N3,PSK1||PSK2) (suitable for mutual authentication) or MAC1=E(N1||N3,PSK1||PSK2) (suitable for unilateral authentication). Before calculation of the message authentication code MAC2, in step S4 an integrity check key N31 and an encryption key N32 may be firstly derived according to N3, the integrity check code ACC2 is calculated using N31, and the ciphertext is formed through encryption using N32, and in that case, MAC2=E(N2,N31||N32) in step S4.

After receiving the authentication response acknowledge message 30 sent by the entity A, the entity B firstly determines whether N2 is equal to N2 generated by itself in step S2. If N2 is not equal to N2 generated by itself in step S2, the entity B discards the authentication response acknowledge message 30. If N2 is equal to N2 generated by itself in step S2, the entity B decrypts the ciphertext in MAC2 using N3 to obtain N2, and calculates an integrity check code ACC2'. The entity B compares the integrity check codes ACC2' and ACC2, and discards the authentication response acknowledge message 30 if ACC2' and ACC2 are not equal to each other, or determines whether N2 obtained by decryption is equal to N2 generated by itself in step S2 if ACC2' and ACC2 are equal to each other. If N2 obtained by decryption is equal to N2 generated by itself in step S2, the entity B determines that the entity A is valid, which means that the entity B performs a successful authentication on the entity A, and the entity B takes N3 as a session key with the entity A. If N2 obtained by decryption is not equal to N2 generated by itself in step S2, the entity B determines that the entity A is invalid and discards the authentication response acknowledge message 30. In a case where the authentication response acknowledge message 30 only contains N2, after receiving the authentication response acknowledge message 30, the entity B determines that the entity A is valid if N2 is determined as being equal to N2 generated by the entity B in step S2, and then takes N3 as a session key with the entity A, or discards the authentication response acknowledge message 30 if N2 is determined as being not equal to N2 generated by the entity B in step S2.

Till now, the present invention implements the mutual authentication between the entities based on a pre-shared key, and meanwhile, issues a session key between the two parties concerned in the authentication, thereby ensuring the secure communication between the subsequent entities.

In other embodiment, in steps S1 and S2, message timeout processing thresholds T1 and T2 may be set for the entity A and the entity B, respectively. Wherein in step S1, if the entity A does not correctly receive the authentication response message 20 within time T1 after sending the authentication request message 10, the entity A resends the authentication request message 10 to the entity B, and if the correct authentication response message 20 is still not received when the authentication request message 10 is resent m times (a preset number of times of resending the authentication request message 10) and the time by which the authentication response message 20 is waited to be received is T1 each time, the entity A determines that the authentication fails. In step S2, if the entity B does not correctly receive the authentication response acknowledge message 30 within time T2 after sending the authentication response message 20, the entity B resends the authentication response message 20 to the entity A, and if the correct authentication response acknowledge message 30 is still not received when the authentication response message 20 is resent p times (a preset number of times of resending the authentication response message 20) and the time by which the authentication response acknowledge message 30 is waited to be received is T2 each time, the entity B determines that the authentication fails. By applying the above message timeout resending mechanism, the packet loss tolerability of the communication process in the present invention can be improved.

In other embodiment, in step S3, the entity A may send an authentication result message to the entity B after receiving the authentication response message 20. If the entity A determines that the entity B is valid, the authentication result message contains authentication success information; otherwise the authentication result message contains authentication failure information. In that case, the entity B may set a message timeout processing threshold T3 in step S2. If the entity B does not correctly receive the authentication result message within time T3 after sending the authentication response message 20, the entity B resends the authentication response message 20 to the entity A, and if the correct authentication result message is still not received after the authentication response message 20 has been resent n times (a preset number of times of resending the authentication response message 20) and the time by which the authentication result message is waited to be received is T3 each time, the entity B determines that the authentication fails.

In other embodiment, in step S4, the entity B may send an authentication result message to the entity A after receiving the authentication response acknowledge message 30. If the entity B determines that the entity A is valid, the authentication result message contains authentication success information; otherwise, the authentication result message contains authentication failure information. In that case, the entity A may set a message timeout processing threshold T4 in step S4. If the entity A does not correctly receive the authentication result message within time T4 after sending the authentication response acknowledge message 30, the entity A resends the authentication response acknowledge message 30 to the entity B, and if the correct authentication result message is still not received after the authentication response acknowledge message 30 has been resent q times (a preset number of times of resending the authentication response acknowledge message 30) and the time by which the authentication result message is waited to be received is T4 each time, the entity A determines that the authentication fails.

In conclusion, the present invention implements an identity authentication between entities based on a symmetric encryption algorithm, and it is also applicable to extensive fields.

The objects, technical solutions and advantages of the present invention are further described in details through the above preferred embodiments. It shall be appreciated that those descriptions are just the preferred embodiments of the present invention, rather than limitations thereto. Any modification, equivalent replacement, improvement, etc. made within the spirit and rule of the present invention shall fall within the protection scope of the present invention. The range of benefits claimed by the present invention shall be determined by the claims of the present invention, rather than being limited to the above embodiments.

What is claimed is:

1. A method for authenticating an entity based on a symmetric encryption algorithm, wherein a Pre-Shared Key (PSK) has been shared between an entity A and an entity B, the method comprising:
    sending, by the entity A, an authentication request message to the entity B, wherein the authentication request message comprises N1, which is a random number generated by the entity A;
    after receiving the authentication request message sent by the entity A, generating, by the entity B, one or two random numbers, and then generating an authentication response message in such a manner that the entity B generates a message authentication code by using N1, the PSK and the one or two random numbers generated by the entity B, wherein the authentication response message includes N1 and the message authentication code,
    sending, by the entity B, the authentication response message to the entity A and taking the one random number or one of the one or two random numbers as a session key with the entity A; and
    determining, by the entity A, the validity of the entity B according to the received authentication response message, wherein the entity A firstly determines whether N1 carried in the authentication response message is equal to N1 generated by the entity A,
    wherein the entity A includes a first transmitter and a first receiver, and the entity B includes a second transmitter and a second receiver,
    wherein the PSK remains unchanged during the process of the authentication between the entity A and the entity B,
    wherein sending, by the entity B, the authentication response message to the entity A after receiving the authentication request message sent by the entity A comprises: after receiving the authentication request message sent by the entity A, generating, by the entity B, a random number N3 and calculating a message authentication code MAC1=E(N1//N3,PSK), wherein "//" represents series connection of messages, E is a symmetric encryption algorithm, and MAC1 contains an integrity check code ACC1 calculated on N1//N3 with the PSK and a ciphertext formed after an encryption; or
    after receiving the authentication request message sent by the entity A, generating, by the entity B, a random number N3 and deriving, by the entity B, an integrity check key PSK1 and an encryption key PSK2 according to the PSK, calculating the integrity check code ACC1 using PSK1, and performing encryption using PSK2 to form a ciphertext, then MAC1=E(N1//N3, PSK1//PSK2);
    constructing, by the entity B, the authentication response message which comprises N1 and MAC1, sending the authentication response message to the entity A, and taking N3 as a session key with the entity A.

2. The method for authenticating an entity based on a symmetric encryption algorithm according to claim 1, wherein after determining, by the entity A, the validity of the entity B according to the received authentication response message, the method further comprises:
    sending, by the entity A, an authentication result message to the entity B, wherein if the entity A determines that the entity B is valid, the authentication result message contains authentication success information; otherwise the authentication result message contains authentication failure information.

3. The method for authenticating an entity based on a symmetric encryption algorithm according to claim 2, wherein the step of sending, by the entity B, the authentication response message to the entity A after receiving the authentication request message further comprises: setting a message timeout processing threshold T3, then
    if the entity B does not correctly receive the authentication result message within time T3 after sending the authentication response message, the entity B resends the authentication response message to the entity A; further, if the entity B still does not correctly receive the authentication result message after the authentication response message has been resent n times and the time by which the authentication result message is waited to be received is T3 each time, the entity B determines that the authentication fails, wherein n is a preset number of times of resending the authentication response message.

4. The method for authenticating an entity based on a symmetric encryption algorithm according to claim 1, wherein after determining, by the entity A, the validity of the entity B according to the received authentication response message, the entity A sends an authentication response acknowledge message to the entity B if the entity B is determined as valid, or the entity A discards the authentication response message if the entity B is determined as invalid, and then the entity B determines the validity of the entity A according to the received authentication response acknowledge message, if the entity A is valid, a mutual identity authentication between the entity A and the entity B is successful, and if the entity A is invalid, the authentication response acknowledge message is discarded.

5. The method for authenticating an entity based on a symmetric encryption algorithm according to claim 4, wherein after receiving the authentication response acknowledge message by the entity B, the method further comprises:
    sending, by the entity B, an authentication result message to the entity A, wherein if the entity B determines that the entity A is valid, the authentication result message contains authentication success information; otherwise the authentication result message contains authentication failure information.

6. The method for authenticating an entity based on a symmetric encryption algorithm according to claim 5, wherein a message timeout processing threshold T4 is further set in the step of sending, by the entity A, the authentication response acknowledge message to the entity B, then
    if the entity A does not correctly receive the authentication result message within time T4 after sending the authentication response acknowledge message, the entity A resends the authentication response acknowledge message to the entity B; further, if the entity A still does not correctly receive the authentication result message after the authentication response acknowledge message has been resent q times and the time by which the authentication result message is waited to be received is T4 each time, the entity A determines that the authentication fails, wherein q is a preset number of times of resending the authentication response acknowledge message.

7. The method for authenticating an entity based on a symmetric encryption algorithm according to claim 1, wherein determining, by the entity A, the validity of the entity B according to the received authentication response message comprises:
    after receiving the authentication response message sent by the entity B, determining, by the entity A, whether N1 is equal to N1 generated when the entity A sends the authentication request message to the entity B, wherein if not equal, the entity A discards the authentication response message; and if equal, the entity A decrypts a ciphertext in MAC1 to obtain N1 and N3, calculates an integrity check code ACC1', and compares whether the integrity check codes ACC1 and ACC1' are equal to each other; if ACC1' and ACC1 are not equal to each other, the entity A discards the authentication response message; if ACC1' and ACC1 are equal to each other, the entity A determines whether N1 obtained by decryption is equal to N1 generated when the entity A sends the authentication request message to the entity B; if equal, the entity A determines that the entity B is valid, which indicates that the entity A performs a successful authentication on the entity B, and the entity A takes N3 obtained by decryption as a session key with the entity B; if not equal, the entity A determines that the entity B is invalid.

8. The method for authenticating an entity based on a symmetric encryption algorithm according to claim 1, wherein sending, by the entity B, the authentication response message to the entity A after receiving the authentication request message comprises:
    after receiving the authentication request message sent by the entity A, generating, by the entity B, random numbers N2 and N3, and calculating a message authentication code MAC1=E(N1//N2//N3,PSK), wherein "//" represents series connection of messages, E is a symmetric encryption algorithm, and MAC1 contains an integrity check code ACC1 calculated on N1//N2//N3 with the PSK and a ciphertext formed after an encryption or contains a ciphertext formed after an encryption of N1//N2//N3 with the PSK and an integrity check code ACC1 calculated on the ciphertext; or
    after receiving the authentication request message sent by the entity A, generating, by the entity B, random numbers N2 and N3, deriving, by the entity B, an integrity check key PSK1 and an encryption key PSK2 according to the PSK, calculating the integrity check code ACC1 using PSK1, and performing encryption using PSK2 to form a ciphertext, then MAC1=E(N1//N2//N3, PSK1//PSK2);
    constructing, by the entity B, the authentication response message which comprises N1 and MAC1, and sending the authentication response message to the entity A.

9. The method for authenticating an entity based on a symmetric encryption algorithm according to claim 8, wherein determining, by the entity A, the validity of the entity B according to the received authentication response message comprises:
    after receiving the authentication response message sent by the entity B, determining, by the entity A, whether N1 is equal to N1 generated when the entity A sends the authentication request message to the entity B, wherein if not equal, the entity A discards the authentication response message; and if equal, the entity A decrypts a ciphertext in MAC1 to obtain N1, N2 and N3, calculates an integrity check code ACC1', and compares whether the integrity check codes ACC1' and ACC 1 are equal to each other; if ACC1' and ACC1 are not equal to each other, the entity A discards the authentication response message; if ACC1' and ACC1 are equal to each other, the entity A determines whether N1 obtained by decryption is equal to N1 generated when the entity A sends the authentication request message to the entity B; if equal, the entity A determines that the entity B is valid, which indicates that the entity A performs a successful authentication on the entity B, and the entity A takes N3 obtained by decryption as a session key with the entity B; if not equal, the entity A determines that the entity B is invalid.

10. The method for authenticating an entity based on a symmetric encryption algorithm according to claim 9, further comprising:
    after performing a successful authentication on the entity B, constructing, by the entity A, the authentication response acknowledge message which comprises N2 and sending the authentication response acknowledge message to the entity B; and after receiving the authentication response acknowledge message sent by the entity A, determining, by the entity B, whether N2 is equal to N2 generated when the entity B sends the authentication response message to the entity A, wherein if not equal, the entity B discards the authentication response acknowledge message; and if equal, the entity B determines that the entity A is valid, which indicates that the entity B performs a successful authentication on the entity A, and the entity B takes N3 as a session key with the entity A.

11. The method for authenticating an entity based on a symmetric encryption algorithm according to claim 9, further comprising:

after performing a successful authentication on the entity B, calculating, by the entity A, MAC2=E(N2,N3), constructing the authentication response acknowledge message which comprises N2 and MAC2, and sending the authentication response acknowledge message to the entity B, wherein E is a symmetric encryption algorithm, MAC2 contains an integrity check code ACC2 calculated on N2 with N3 and a ciphertext formed after an encryption; or after performing a successful authentication on the entity B, deriving, by the entity A, an integrity check key N31 and an encryption key N32 according to N3, calculating the integrity check code ACC2 using N31, and performing encryption using N32 to form a ciphertext, then MAC2=E(N2, N31//N32).

12. The method for authenticating an entity based on a symmetric encryption algorithm according to claim 11, wherein determining, by the entity B, the validity of the entity A according to the received authentication response acknowledge message comprises:

after receiving the authentication response acknowledge message sent by the entity A, determining, by the entity B, whether N2 is equal to N2 generated when the entity B sends the authentication response message to the entity A, wherein if not equal, the entity B discards the authentication response acknowledge message; and if equal, the entity B decrypts a ciphertext in MAC2 using N3 to obtain N2, calculates an integrity check code ACC2', and compares whether the integrity check codes ACC2' and ACC2 are equal to each other; and if ACC2' and ACC2 are not equal to each other, the entity B discards the authentication response acknowledge message; if ACC2' and ACC2 are equal to each other, the entity B determines whether N2 obtained by decryption is equal to N2 generated when the entity B sends the authentication response message to the entity A; if equal, the entity B determines that the entity A is valid, which indicates that the entity B performs a successful authentication on the entity A, and the entity B takes N3 obtained by decryption as a session key with the entity A; and if not equal, the entity B determines that the entity A is invalid and discards the authentication response acknowledge message.

13. The method for authenticating an entity based on a symmetric encryption algorithm according to claim 1, wherein a message timeout processing threshold T1 of the entity A is further set in the step of sending, by the entity A, the authentication request message to the entity B, then if the entity A does not correctly receive the authentication response message within time T1 after sending the authentication request message, the entity A resends the authentication request message to the entity B; further, if the entity A still does not correctly receive the authentication response message after the authentication request message has been resent m times and the time by which the authentication response message is waited to be received is Ti each time, the entity A determines that the authentication fails, wherein m is a preset number of times of resending the authentication request message.

14. The method for authenticating an entity based on a symmetric encryption algorithm according to claim 1, wherein a message timeout processing threshold T2 of the entity B is further set in the step of sending, by the entity B, the authentication response message to the entity A after receiving the authentication request message, then if the entity B does not correctly receive the authentication response acknowledge message within time T2 after sending the authentication response message, the entity B resends the authentication response message to the entity A; further, if the entity B still does not correctly receive the authentication response acknowledge message after the authentication response message has been resent p times and the time by which the authentication response acknowledge message is waited to be received is T2 each time, the entity B determines that the authentication fails, wherein p is a preset number of times of resending the authentication response message.

15. An authenticating entity based on a symmetric encryption algorithm, wherein the authenticating entity has shared a Pre-Shared Key (PSK) with an entity to be authenticated; the authenticating entity comprising:

a first sending module, including a first transmitter, configured to send an authentication request message to the entity to be authenticated, wherein the authentication request message comprises N1, which is a random number generated by the authenticating entity;

a first receiving module, including a first receiver, configured to receive an authentication response message which is returned by the entity to be authenticated after having received the authentication request message, wherein the entity to be authenticated generates one or two random numbers and then generates the authentication response message after having received the authentication request message; and a first authenticating module, including a first processor, configured to determine the validity of the entity to be authenticated according to the received authentication response message, wherein the first authenticating module firstly determines whether N1 carried in the authentication response message is equal to N1 generated by the authenticating entity, wherein the authenticating entity includes the first transmitter and the first receiver, and the entity to be authenticated includes a second transmitter and a second receiver, wherein the PSK remains unchanged during the process of the authentication between the authenticating entity and the entity to be authenticated, wherein the entity to be authenticated generates one or two random numbers and then generates the authentication response message after having received the authentication request message in such a manner:

after receiving the authentication request message sent by the authenticating entity, generating, by the entity to be authenticated, a random number N3 and calculating a message authentication code MAC1=E(N1//N3,PSK), wherein "//" represents series connection of messages, E is a symmetric encryption algorithm, and MAC1 contains an integrity check code ACC1 calculated on N1//N3 with the PSK and a ciphertext formed after an encryption; or after receiving the authentication request message sent by the authenticating entity, generating, by the entity to be authenticated, a random number N3 and deriving, by the entity to be authenticated, an integrity check key PSK1 and an encryption key PSK2 according to the PSK, calculating the integrity check code ACC1 using PSK1, and performing encryption using PSK2 to form a ciphertext, then MAC1=E(N1//N3,PSK1//PSK2);

constructing, by the entity to be authenticated, the authentication response message which comprises N1 and MAC1, sending the authentication response message to the authenticating entity, and taking N3 as a session key with the authenticating entity.

16. The authenticating entity according to claim 15, further comprising:
a second sending module, including a third transmitter, configured to send an authentication response acknowledge message to the entity to be authenticated when the entity to be authenticated is valid, so that the entity to be authenticated determines the validity of the authenticating entity after receiving the authentication response acknowledge message.

17. An entity to be authenticated based on a symmetric encryption algorithm, wherein the entity to be authenticated has shared a Pre-Shared Key (PSK) with an authenticating entity; the entity to be authenticated comprising:
a first receiving module, including a first receiver, configured to receive an authentication request message sent by the authenticating entity, wherein the entity to be authenticated generates one or two random numbers and then generates an authentication response message after having received the authentication request message; and
a first sending module, including a first transmitter, configured to send the authentication response message to the authenticating entity, so that the authenticating entity determines the validity of the entity to be authenticated according to the authentication response message, wherein the authenticating entity firstly determines whether N1 carried in the authentication response message is equal to N1 generated by the authenticating entity, wherein the authenticating entity includes a second transmitter and a second receiver, and the entity to be authenticated includes the first transmitter and the first receiver, wherein the PSK remains unchanged during the process of the authentication between the authenticating entity and the entity to be authenticated, wherein the entity to be authenticated generates one or two random numbers and then generates an authentication response message after having received the authentication request message in such a manner:

after receiving the authentication request message sent by the authenticating entity, generating, by the entity to be authenticated, a random number N3 and calculating a message authentication code MAC1=E(N1//N3,PSK), wherein "//" represents series connection of messages, E is a symmetric encryption algorithm, and MAC1 contains an integrity check code ACC1 calculated on N1//N3 with the PSK and a ciphertext formed after an encryption; or after receiving the authentication request message sent by the authenticating entity, generating, by the entity to be authenticated, a random number N3 and deriving, by the entity to be authenticated, an integrity check key PSK1 and an encryption key PSK2 according to the PSK, calculating the integrity check code ACC1 using PSK1, and performing encryption using PSK2 to form a ciphertext, then MAC1=E(N1//N3,PSK1//PSK2);

constructing, by the entity to be authenticated, the authentication response message which comprises N1 and MAC1, sending the authentication response message to the authenticating entity, and taking N3 as a session key with the authenticating entity.

18. The authenticated entity according to claim 17, further comprising:
a second receiving module, including a third receiver, configured to receive an authentication response acknowledge message sent by the authenticating entity; and
a second authenticating module, including a processor, configured to determine the validity of the authenticating entity after receiving the authentication response acknowledge message.

* * * * *